United States Patent
Lind

[11] Patent Number: 6,043,733
[45] Date of Patent: Mar. 28, 2000

[54] VEHICLE LOCK HAVING AN INTEGRAL ALARM AND SIGNAL TRANSMISSION MEANS

[76] Inventor: Carl E. Lind, 36614 Kay Ave., Zephyrhills, Fla. 35514

[21] Appl. No.: 09/136,510

[22] Filed: Aug. 19, 1998

[51] Int. Cl.⁷ .................................................. B60R 25/10
[52] U.S. Cl. ......................... 340/426; 340/427; 307/10.2; 70/39; 70/237
[58] Field of Search ..................... 340/426, 427, 340/432, 542; 307/10.2; 70/20, 21, 31, 39, 38 A, 41, 237, 252, 256, 257, 258, 259, 260

[56] References Cited

U.S. PATENT DOCUMENTS

| | | | |
|---|---|---|---|
| 5,194,845 | 3/1993 | Sirmon et al. | 340/427 |
| 5,372,019 | 12/1994 | Hsiao | 70/38 A |
| 5,404,735 | 4/1995 | Hsieh | 70/38 A |
| 5,408,212 | 4/1995 | Meyers et al. | 340/427 |
| 5,408,213 | 4/1995 | Ungarsohn | 340/427 |
| 5,525,964 | 6/1996 | Ming | 340/542 |
| 5,534,847 | 7/1996 | McGregor | 340/432 |
| 5,546,776 | 8/1996 | Sun et al. | 70/233 |
| 5,552,759 | 9/1996 | Stoyka . | |
| 5,568,120 | 10/1996 | LeMense et al. . | |
| 5,587,701 | 12/1996 | Hess . | |
| 5,630,209 | 5/1997 | Wizgall et al. . | |
| 5,635,899 | 6/1997 | Carlo et al. | 340/426 |
| 5,652,564 | 7/1997 | Winbush . | |
| 5,680,119 | 10/1997 | Magliari et al. . | |
| 5,836,002 | 11/1998 | Morstein et al. | 340/568 |

*Primary Examiner*—Nina Tong
*Attorney, Agent, or Firm*—Kenneth L Tolar

[57] ABSTRACT

A lock for a vehicle such as a motorcycle includes a housing having a U-shaped portion and a transverse portion attached thereto. A first terminal end of the U-shaped portion is removeably received within an opening on the transverse portion allowing the housing to be secured about a portion of a vehicle. Removeably received within the transverse portion is a tubular insert having a keypad thereon in communication with an audible alarm means. The alarm means is in communication with a wire disposed within the U-shaped portion for emitting an audible alarm if the U-shaped portion is severed. The alarm means also activates a cellular transmission means for automatically dialing a predetermined number upon the alarm means being activated.

4 Claims, 2 Drawing Sheets

VEHICLE LOCK HAVING AN INTEGRAL ALARM AND SIGNAL TRANSMISSION MEANS

BACKGROUND OF THE INVENTION

The present invention relates to a lock for a vehicle having an audible alarm and cellular transmission means for notifying a remote user that the lock has been cut or broken.

DESCRIPTION OF THE PRIOR ART

Motorcycles, bicycles and similar vehicles have always been an easy target for thieves. The ignition and engine are more accessible than that of automobiles so that such vehicles are more susceptible to hot wiring and similar techniques. In addition, because such vehicles are relatively lightweight, they may be easily loaded onto a larger vehicle or pushed to another location. Accordingly, there is a current need for a device which securely locks a motorcycle and similar smaller vehicles. Although conventional locking assemblies such as chains exist in the prior art, such devices are inadequate because they may be easily cut or broken in a relatively short period of time. The present invention provides a substantial improvement over conventional locking assemblies in that it includes an audible alarm and a cellular transmission means which are automatically activated upon the lock being cut or broken.

Although numerous vehicle alarm systems exist in the prior art, none have the unique features and benefits according to the present invention. For example, U.S. Pat. No. 5,680,119 issued to Magliari et al. relates to a vehicle responsive alert system including a receiver for identifying signals from school buses, emergency vehicles and the like to activate a signaling means to identify the location of the emergency.

U.S. Pat. No. 5,652,564 issued to Winbush relates to a bold thief security system that allows a user to remotely disable a vehicle that has been carjacked.

U.S. Pat. No. 5,630,209 issued to Wizgal et al. relates to an emergency call system including a wireless telecommunication network having predetermined radio channels, at least one transmission device for reading and transmitting an emergency call message on at least one of the channels and a call receiver device.

U.S. Pat. No. 5,587,701 issued to Hess relates to a portable alarm system including a portable enclosure in communication with contacts at various points of entry. The alarm initiates a telephone call via conventional telephone lines or via a cellular transmission device.

U.S. Pat. No. 5,568,120 issued to LeMense et al. relates to an anti-theft system with remote controlled verification of arming.

U.S. Pat. No. 5,552,759 issued to Stoyka relates to an electronic system for detecting vehicle wheel theft. The device includes a sensor mounted to a vehicle's wheel that transmits a signal to a receiver when the sensor is removed.

Although various vehicle alarms exist in the prior art, none relate to a unique locking device according to the present invention. The locking device is separable allowing it to be secured about a portion of a vehicle to disable it or to secure it to a fixed, immovable object. If the locking device is broken or cut, an audible alarm is emitted and a cellular transmission means dials a predetermined telephone number such as that of a beeper or a cellular telephone.

SUMMARY OF THE INVENTION

The present invention relates to a locking device for vehicles having an automated dialing system thereon. The device comprises a housing including a hollow U-shaped portion having a pair of terminal ends with a transverse member attached thereto. One of the terminal ends is removably attached allowing the housing to be secured about a closed loop portion of a vehicle. The U-shaped portion has a wire received therein. The transverse member is hollow and has a closed end and an opposing open end in communication with an interior chamber for receiving a tubular insert. A keypad is disposed on the exterior of the insert and is in communication with internal circuitry which provides power to an alarm means upon a predetermined code being entered into the keypad. The open end of the transverse portion is covered with a cap member. The insert includes a locking means for locking the removable terminal end of the U-shaped portion within a chamber on the insert and which also establishes electrical communication between the wire, the alarm means and the cellular transmission means. Accordingly, when the device is installed on a vehicle, a relay will activate the cellular transmission means and the alarm means if the circuit path is broken such as if the lock is cut or broken. It is therefore an object of the present invention to provide a vehicle lock that emits an audible alarm upon being cut or broken.

It is yet another object of the present invention to provide a vehicle lock that automatically dials a predetermined telephone number when a vehicle is being stolen.

It is yet another object of the present invention to provide a vehicle lock that instantly alerts a remote user that an unauthorized person is tampering with the vehicle.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
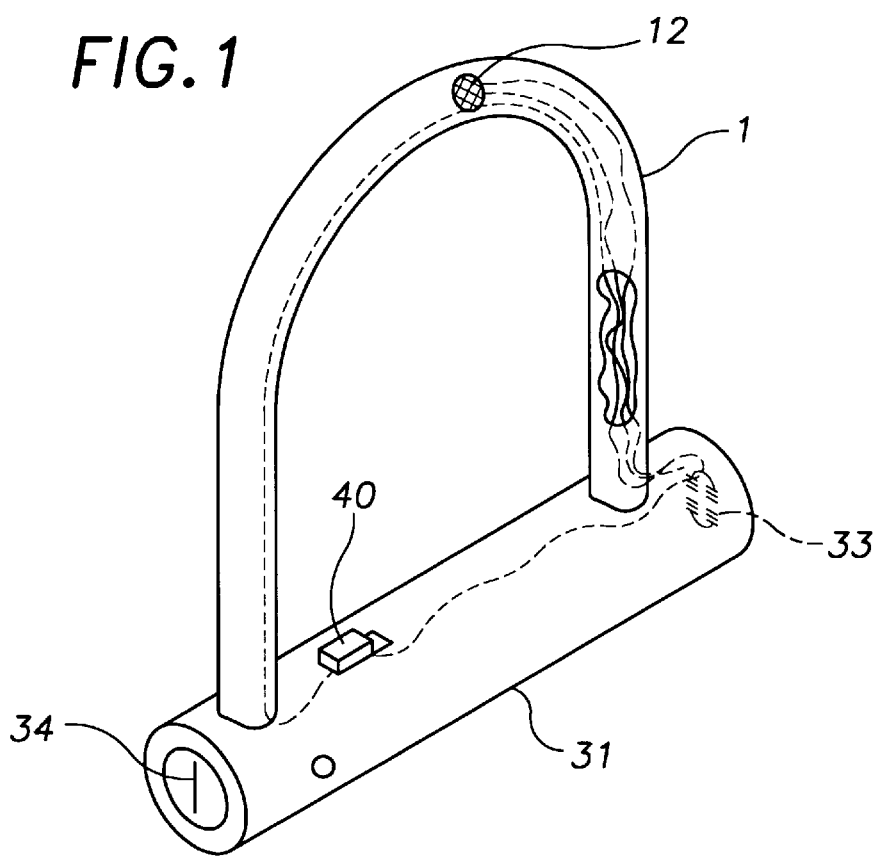
FIG. 1 is a perspective view of the inventive device.
Figure 2:
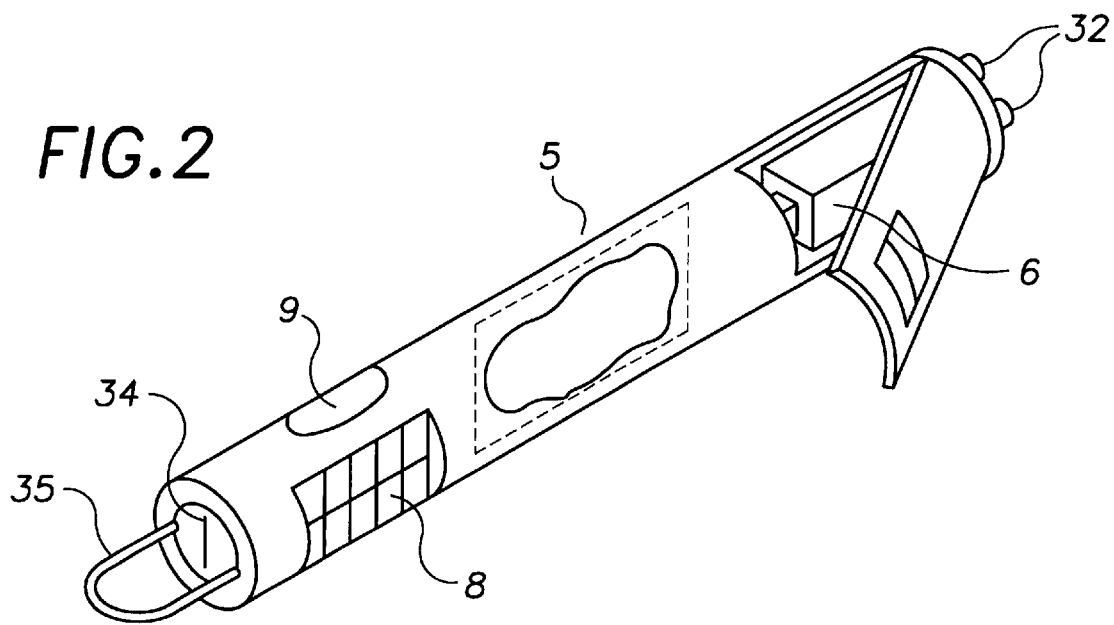
FIG. 2 is a perspective view of the tubular insert.
Figure 3:
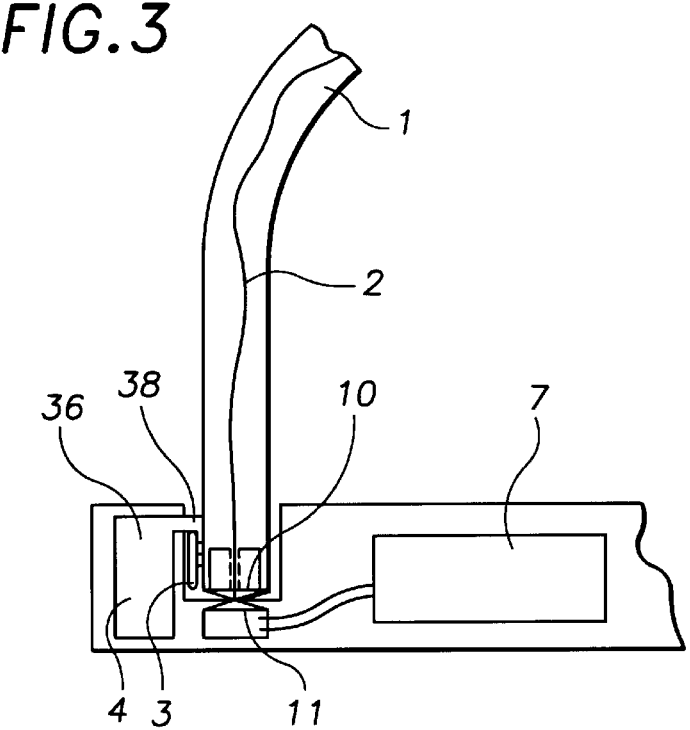
FIG. 3 is a partial cross-sectional view of the tubular insert with a terminal end of the U-shaped portion attached thereto.

Referring now to FIGS. 1 through 4, the present invention relates to a lock for motorcycles and similar vehicles having an alarm and cellular transmission means integral therewith. The device comprises a housing including a hollow U-shaped portion 1 having a pair of terminal ends and a wire 2 received therein. The U-shaped portion includes a disk shaped projection 3 such as a rivet adjacent a first terminal end for selectively engaging a locking means 4 on a tubular insert as described below.

An elongated hollow tubular transverse portion 31 is attached to the terminal ends of the U-shaped portion with at least one of the terminal ends being removable therefrom as described in more detail below. The transverse portion includes a closed end, an open end in communication with an interior chamber and a pair of apertures each for receiving a terminal end of the U-shaped portion.

Removably received within the transverse portion is a tubular insert 5 having a battery means 6 and circuit means 7 received therein. A keypad 8 is mounted on the exterior of the tubular insert 5 for delivering power from the battery means 6 to the circuit means 7 upon a predetermined sequence of numbers being entered therein. The insert includes a chamber 9 that aligns with one of the apertures on the transverse portion for receiving the first end of the U-shaped portion. The chamber is defined by side walls and a bottom wall. The insert also includes a pair of electrical contacts 32 at an end thereof that engage contacts 33 within the transverse portion to establish electrical communication between the wire 2 and a circuit as described in more detail below.

A conventional locking means 4 is received within the insert at an opposing end and is movable between a locked and unlocked position. A slot 34 dimensioned to receive a key is disposed on the first end on the insert to operate the locking means between its locked and unlocked position. A loop 35 may also be provided to assist a user in removing the insert.

The locking means relates to a rotatable tumbler 36 received within the tubular insert 5 insert having an arcuate, substantially semicircular sleeve 38 that rotates about the edge of the rivet on the first end of the U-shaped portion to removably lock the U-shaped portion within the transverse portion. The first end of the U-shaped portion includes an electrical contact 10 in communication with the internally disposed wire 2. The contact engages a second electrical contact 11 on the chamber bottom wall when the terminal end is placed within the chamber. Accordingly, a complete circuit is formed between the wire and circuit means via contacts 10, 11 and 32. A speaker 12 is disposed on the exterior surface of the U-shaped portion and is in communication with the wire and circuitry for emitting an audible alarm if the circuit is interrupted such as if the housing is cut or if the lock is broken.

Figure 4:
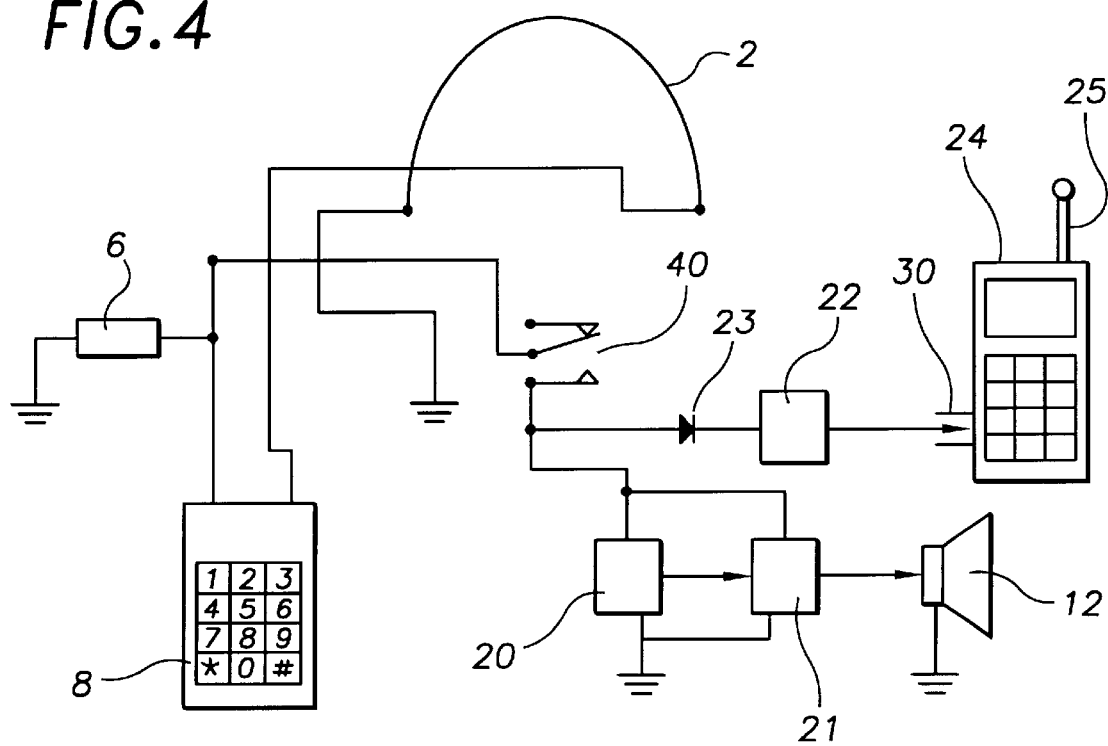
FIG. 4 depicts a schematic of the electronic circuitry according to the present invention.

Referring now to FIG. 4, the keypad 8 is in communication with a battery means 6 for delivering power to the circuit 7 upon a predetermined code being entered therewith. In the event that the wire 2 within the U-shaped portion is severed or the lock is removed by an unauthorized user, a relay transmits 40 a signal to an audio oscillator 20 and amplifier 21 thereby emitting an audible alarm via the speaker 12.

The relay simultaneously transmits a signal to a transistor switch 22 via a voltage blocking diode 23. The transistor switch closes, delivering power to an external cellular telephone 24. The cellular telephone resembles a conventional cellular phone and further includes an external receptacle 30 wired to a conventional redial switch. A cord couples the transistor to the external receptacle to dial a predetermined telephone number when the transistor switch 22 closes. A switch means 40 establishes communication between the battery means and the circuit. Using the cellular telephone keypad, a user can therefore dial a number corresponding to a remote receiving means such as a pager or cellular telephone being carried by the user. In the event that the lock is broken or cut, the cellular transmission means will automatically dial the selected number. The telephone is connected to an antenna 25 attached to the exterior surface of the housing to assist in transmission. Preferably, the transverse portion is dimensioned to receive both the telephone and insert so that the telephone is securely locked therewithin.

The lock housing may be secured to a motorcycle disc brake rotor or a similar location which secures or disables the vehicle. Although the device is primarily designed for a motorcycle, it may be used to secure other vehicles such as bicycles, jet skiis, snowmobiles, etc. The housing is preferably constructed with steel or a similar durable material. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A locking device for a vehicle comprising:
   a housing including a substantially U-shaped portion having a pair of terminal ends with a hollow transverse portion attached to said terminal ends with at least one terminal end being removable therefrom allowing said housing to be secured about a select portion of a vehicle;
   a locking means for locking said removable terminal end to said transverse portion;
   an alarm means for audibly alerting a user when said housing is removed from the select portion of a vehicle by an unauthorized user;
   a cellular transmission means in communication with said alarm means for dialing a predetermined telephone number upon said alarm means being activated; and wherein said alarm means comprises a conductive path within said U-shaped portion in communication with a circuit means received within said transverse portion, said circuit means initiating an audible alarm upon said conductive path being interrupted.

2. A device according to claim 1 wherein said circuit means is disposed within a tubular insert having an exterior surface, said insert removeably received within said transverse portion.

3. A device according to claim 2 wherein said tubular insert further comprises a keypad on the exterior surface thereof, said keypad in communication with said alarm means for delivering power thereto upon a predetermined sequence of numbers being entered into said keypad.

4. A device according to claim 3 wherein said insert further comprises a chamber for aligning with an aperture on said transverse portion both of which removably receive the removable terminal end of said U-shaped portion.

* * * * *